& Simpson

United States Patent [19]
White et al.

[11] Patent Number: 4,477,939
[45] Date of Patent: Oct. 23, 1984

[54] REMOVABLE SLUDGE CLEANER FOR TANKS

[75] Inventors: Harold R. White, New Lenox; Alex J. Doncer, Palos Heights, both of Ill.

[73] Assignee: Alar Engineering Corporation, Mokena, Ill.

[21] Appl. No.: 461,656

[22] Filed: Jan. 27, 1983

[51] Int. Cl.$^3$ ............... B01D 21/24; F22B 37/48
[52] U.S. Cl. ..................... 15/246.5; 15/1.7; 134/104; 210/232; 210/525
[58] Field of Search ............ 210/523, 524, 525, 527, 210/528, 530, 531, 803, 232, 238; 74/89.15; 134/104, 109; 15/1.7, 246.5, 301

[56] References Cited

U.S. PATENT DOCUMENTS

| | | | |
|---|---|---|---|
| 2,307,107 | 1/1943 | Bryson | 210/237 |
| 2,670,080 | 2/1954 | Scott | 210/527 |
| 3,337,057 | 8/1967 | Bolton | 210/527 |
| 3,627,668 | 12/1971 | Wethly | 210/527 |
| 3,691,858 | 9/1972 | Wilke | 74/89.15 |
| 4,144,174 | 3/1979 | Graham et al. | 210/527 |
| 4,193,871 | 3/1980 | White et al. | 210/142 |
| 4,257,900 | 3/1981 | White et al. | 210/776 |

FOREIGN PATENT DOCUMENTS

| | | | |
|---|---|---|---|
| 2039321 | 2/1972 | Fed. Rep. of Germany | 210/525 |
| 727690 | 4/1955 | United Kingdom | 210/527 |

*Primary Examiner*—Richard V. Fisher
*Assistant Examiner*—John W. Czaja
*Attorney, Agent, or Firm*—Hill, Van Santen, Steadman & Simpson

[57] ABSTRACT

A portable removable sludge cleaner for tanks is provided in two sections, one of which rests on top of the tank and has a travelling bridge from which is suspended the second section. This second section is a suction head carrying frame unit deposited into one end of the tank with the aid of a crane or overhead pulley. The travelling bridge section is then deposited on top of the tank by the crane or pulley. The bridge is centered for balance during the mounting operation and after depositing on the tank, the bridge is moved over the suction head unit previously deposited in the end of the tank. Ramp hitches on the bridge then engage support pins on the head unit lifting its front end off of the bottom of the tank. Pipe couplings on the rear end of the unit are then connected to counterparts depending from the bridge to lift the rear end of the unit off of the tank bottom. The bridge travels on tracks provided by the frame and is propelled by a drive screw to traverse the length of the tank. Four suction heads on the bottom of the header unit are connected by individual pipes and valves to a suction pump on the bridge to be selectively evacuated to sweep sludge from the bottom of the tank for discharge over the side of the tank from the pump. The heads are positioned to each clean a quadrant of the tank bottom.

12 Claims, 9 Drawing Figures

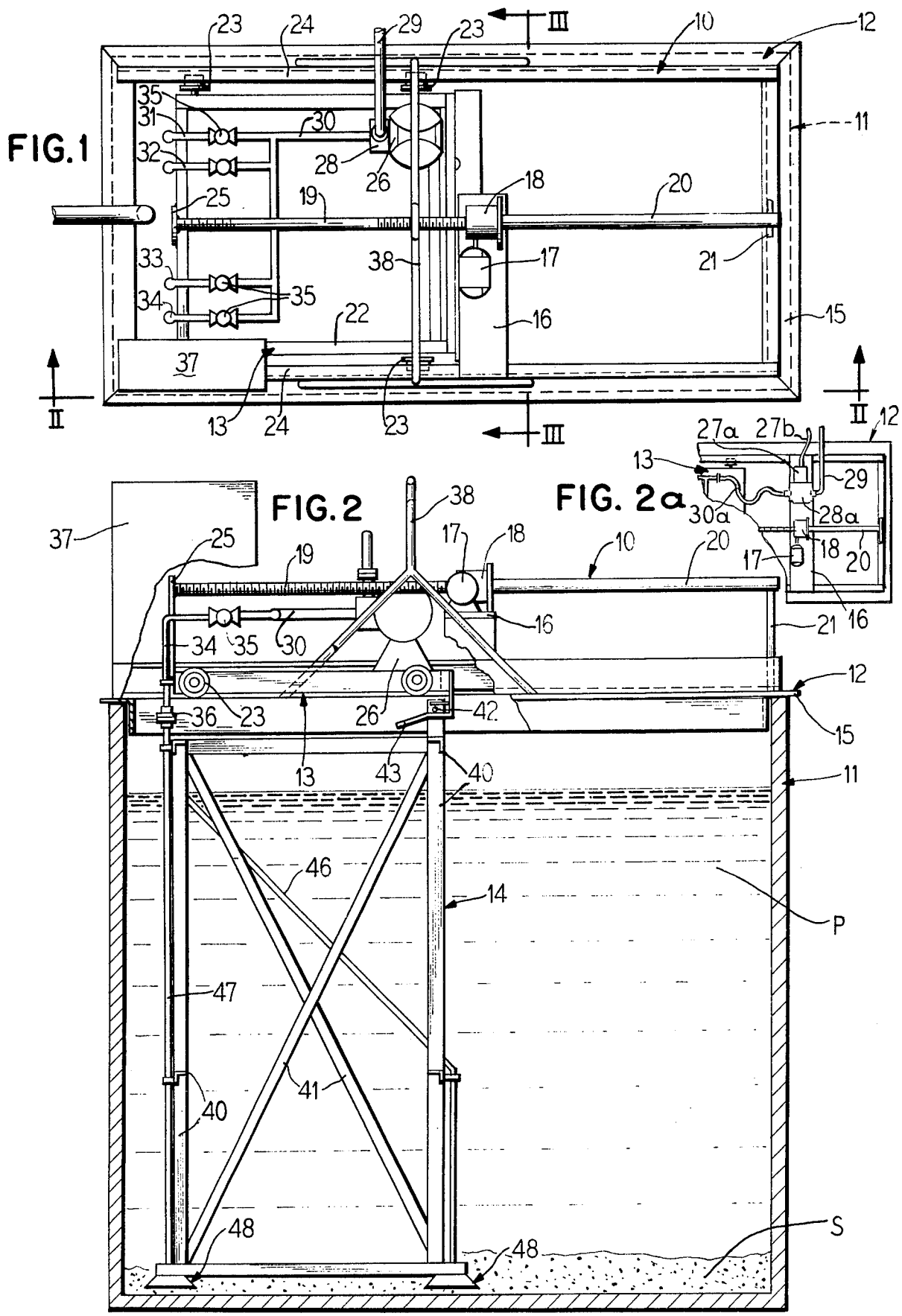

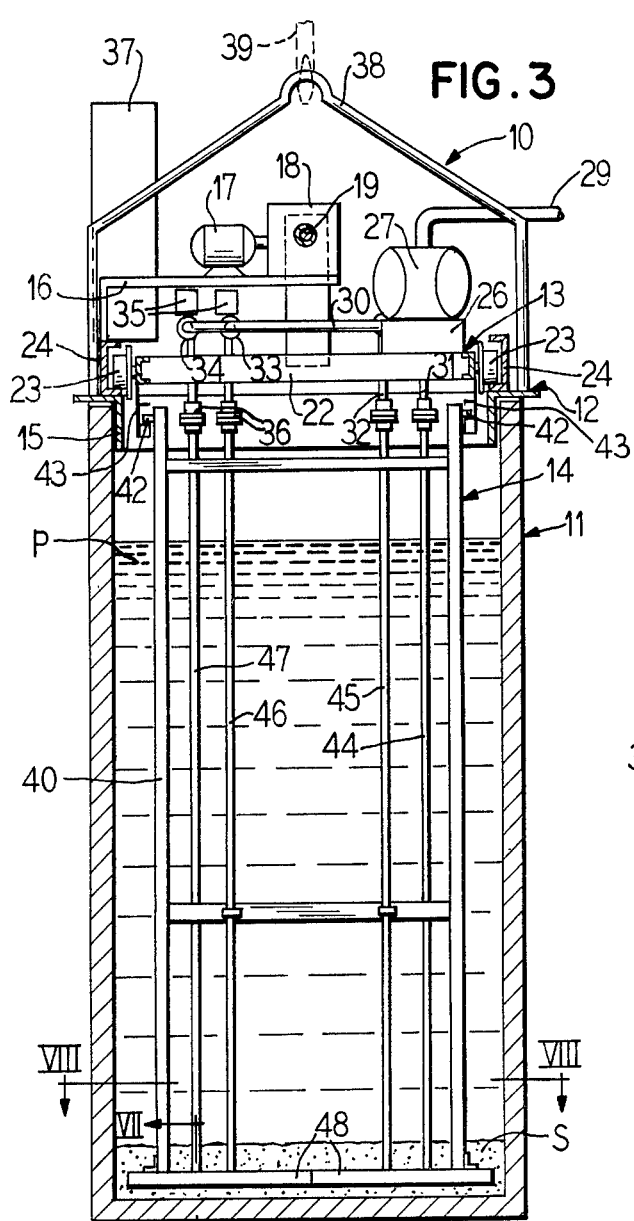
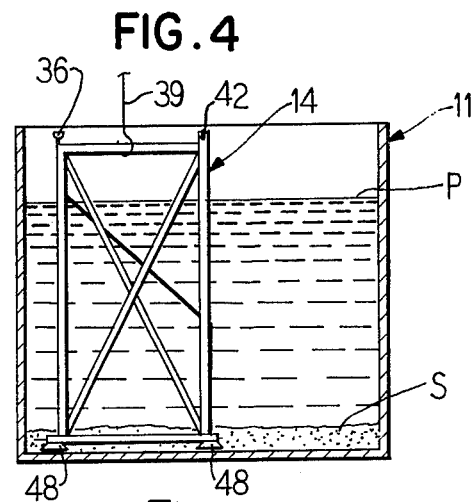
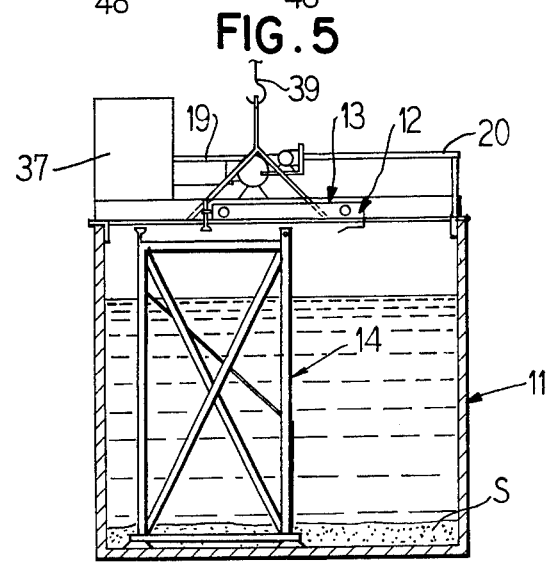
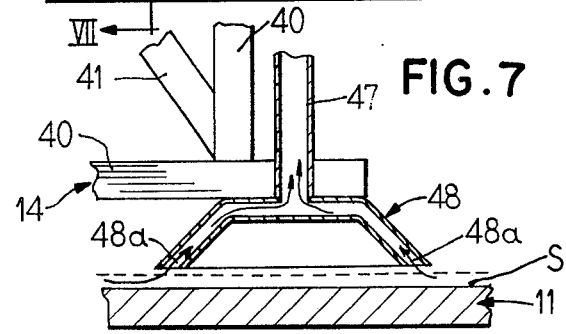
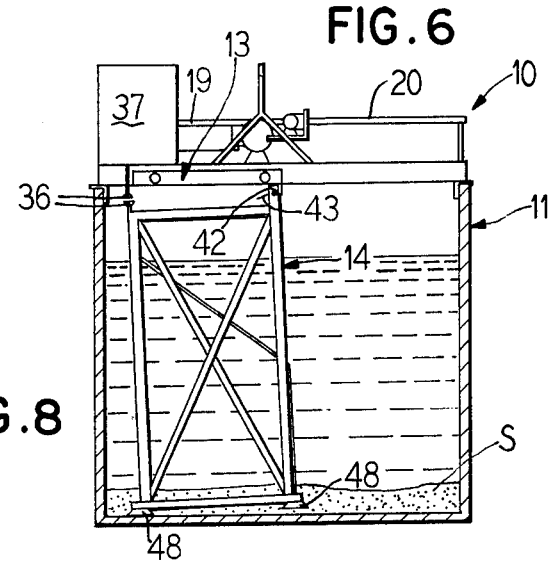
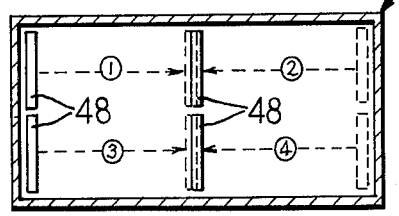

REMOVABLE SLUDGE CLEANER FOR TANKS

BACKGROUND OF THE INVENTION

1. Field of the Invention

This invention relates to the art of removing sludge from tanks and particularly deals with a suction cleaner servicing a plurality of tanks having a travelling bridge mounted on top of a tank suspending a plurality of suction heads in the bottom of the tank.

2. Prior Art

Travelling bridge clarifiers are known in the art being disclosed and claimed in our prior U.S. Pat. No. 4,193,871. While these clarifiers had a bridge suspending a plurality of suction heads in a settling tank, the tank was a permanent part of the assembly and was sized and shaped to settle out solids from a pond of liquid that was continuously supplied into one end of the tank with clarified liquid being continuously overflowed from the other end of the tank.

In industry, however, there are many tank installations that have to be periodically freed from sludge deposited in the bottoms thereof without flowing the contents of the tank through a clarifier. For example, in industrial electroplating, phosphating, and etching operations, it is not practical to flow the solutions continuously through a clarifier and the plating and etching tanks accumulate sludge which must be periodically removed to avoid contamination of the products being treated. It would then be an improvement in this art if such tanks could be cleaned with portable apparatus without emptying the tanks or circulating the liquid through separate clarifiers.

SUMMARY OF THIS INVENTION

According to this invention, there is provided a portable sludge cleaner for conventional plating tanks and the like which has a frame for resting on top of the tank supporting a travelling bridge suspending a plurality of suction heads in the bottom of the tank. The frame provides tracks for wheels of the bridge and supports a drive screw for propelling the bridge. The bridge carries valved piping and a suction pump mounted on the bridge or frame and has an inlet coupled to the piping. The suction heads are mounted on the bottom of a rigid cage unit or truss frame which is suspended from the bridge and can be easily connected to or removed from the bridge if desired. For this purpose, a ramp hitch on the bridge lifts the unit off of the bottom of the tank and pipe couplings join pipes from the suction heads to the valved piping on the bridge for selective and sequential evacuation of the pick-up heads.

A conventional crane or overhead pulley can first deposit the cage into one end of the tank and the bridge frame on top of the tank with the bridge centered on the frame for balance and then moved to pick up the cage.

To place the cleaners of this invention in operation it is only necessary to plug into a conventional source of electric current which will drive motors for the suction pump and the bridge drive screw. Alternately, an air motor could be used, especially for a diaphragm type suction pump, and in such modification, a conventional compressed air source, commonly provided in industrial plants would be used to energize the air motor.

It is then an object of this invention to provide a portable sludge cleaner for tanks and the like.

A specific object of this invention is to provide a travelling bridge sludge cleaner which is easily mounted on and removed from conventional industrial tanks containing ponds of liquid from which a sludge is deposited on the bottoms thereof.

A further object is to provide a rigid structure suspended from the bridge of a sludge cleaner which will hold suction heads in position as they travel through the sludge.

Another object of this invention is to provide a compact easily stored portable sludge cleaner for tanks which can be installed in two sections including a rigid suction head carrying cage or frame first deposited in the tank and a bridge frame mounted on top of the tank with a pickup connection suspending the cage from the bridge.

Other and further objects of this invention will become apparent to those skilled in this art from the following detailed description of the annexed sheets of drawings which illustrate a preferred embodiment of the invention.

ON THE DRAWINGS

FIG. 1 is a plan view of a removable sludge cleaner of this invention mounted on a tank.

FIG. 2 is a longitudinal cross-sectional view generally along the line II—II of FIG. 1.

FIG. 2A is a fragmentary plan view showing an alternate pump arrangement for the cleaner of FIGS. 1 and 2.

FIG. 3 is a transverse cross-sectional view along the line III—III of FIG. 1.

FIGS. 4, 5 and 6 are somewhat diagrammatic side views illustrating the manner in which the cleaner of this invention is mounted in two sections in a tank shown in longitudinal cross section.

FIG. 7 is a fragmentary cross-sectional view of a suction head along the line VII—VII of FIG. 3.

FIG. 8 is a diagrammatic cross-sectional view along the line VIII—VIII of FIG. 3 illustrating the sequence of activation of the suction heads.

BRIEF DESCRIPTION OF PREFERRED EMBODIMENT

In FIGS. 1 to 3, the reference numeral 10 designates generally a portable travelling bridge tank mounted sludge cleaner of this invention. The cleaner 10 is illustrated as mounted on the open top of a tank 11 of the type commonly used in industrial electroplating, etching, cleaning, and the like operations. The tank 11 is generally rectangular in shape filled with a pond P of liquid from which the sludge S has settled and collected in the bottom of the tank.

The cleaner 10 is provided in two sections including a frame 12 mounting a travelling bridge 13 on the top of the tank and a suction head support cage or truss frame 14 suspended in the tank from the bridge 13.

The frame 12 includes a peripheral angle beam base 15 fitting the top of the tank 11 with one leg resting on the top edge of the tank and the other leg extending into the mouth of the tank closely adjacent the walls thereof so that when the frame is deposited on top of the tank, it will fit rather snugly and will not shift.

The frame supports an overhead platform 16 on which is mounted an electric motor 17 driving a ball nut actuator 18 for an elongated power screw 19 telescoping into a tube 20 extending from the actuator 18 to a support 21 on top of the end of the frame 12. The screw rod 19 overlies the bridge 13 which, as illustrated has a channel beam peripheral frame 22 with four side wheels 23 riding in channel beam tracks 24 which are mounted on top of the side angle beams 15 of the frame 12. One end of the screw rod 19 is secured to a support 25 on the bridge frame 22 so that when the motor 17 drives the ball nut actuator 18, the screw rod 19 will telescope into and out of the tube 20 for reciprocating the bridge along the length of the frame 12.

The bridge frame 22 supports a platform 26 on which is mounted a motor 27 driving a suction pump 28 having a discharge outlet pipe 29 extending over the side of the main frame 12 and an inlet pipe 30 connected to four branch pipes 31, 32, 33 and 34 each containing a control valve 35. The pump 28 is preferably an air actuated diaphragm pump with the motor 27 symbolizing an air energized driver for the pump diaphragm. The air motor is activated from a conventional shop source of compressed air. Each branch pipe 31-34 has a quick disconnect type coupling 36 at the bottom end of a vertical leg thereof depending over an end of the bridge 13 into the space surrounded by the main frame beams 15.

Alternately, to lighten the load on the bridge, the motor 27 and pump 28 can be mounted on the main frame 12, for example on the platform 16, in which modification the inlet pipe 30 would be a flexible hose. This modification provides for a fixed discharge outlet. As shown in FIG. 2A, the platform 16 spans the frame 12 and has an air motor 27a actuated from a compressed air pipe or hose 27b driving a diaphragm pump 28a with a flexible hose inlet 30a connected to the valved branch pipes on the bridge 13. The pump 28a discharges to a stationary outlet pipe 29. The platform 16 also supports the screw rod actuator 18 and its drive motor 17.

An upstanding control and monitoring panel 37 is mounted in a convenient location on the main frame 12 above the bridge 13.

A yoke 38 is secured to the side angle beams 15 of the frame 12 at about the longitudinal center thereof to receive a lifting hook 39 from a crane or overhead pulley for transporting the overhead frame unit 12 between tanks and for depositing the same onto the top of the tank to be cleaned. When the frame is being transported the bridge is positioned midway between the ends thereof to balance the load.

The head unit 14 has a square box frame composed of upright and horizontal angle beams 40 with diagonal reenforcing truss or stiffening beams 41. The top forward end of the unit 14 has laterally projecting lugs 42 adapted to engage ramp type hitches 43 depending from the front side corners of the bridge frame 22.

The four suction pipes or tubes 31-34 are connected through the couplings 36 to the upper ends of pipes 44, 45, 46 and 47 respectively with the lower ends of these pipes connected to individual suction heads 48 mounted on the bottom of the cage frame 14. As shown in FIGS. 2 and 3, four heads 48 are provided with a front pair in side-by-side relation to extend transversely across the width of the tank at the front end of the cage 14 and with a rear paid in side-by-side relation at the rear end of the cage. These suction heads 48 are securely fixed as by welding to the angle beams 40 at the bottom of the unit 14. The unit 14 is rigid and strong to hold the heads 48 against deflection as they are moved through heavy sludge S at the bottom of the tank 11.

As shown in FIG. 7, the heads 48 are channel shaped with sloping side legs providing front and rear narrow slot inlets 48a discharging to the pipe 47 which is connected to the top wall thereof. The narrow slot passages are effective to provide high velocity in the paths for the sludge S being sucked or swept from the bottom of the tank 11.

As shown in FIG. 4, the lifting hook 39 deposits the cage unit 14 into one end of the tank 11 with the suction heads 48 resting on the bottom of the tank. Then, as shown in FIG. 5, the frame unit 12 is deposited on the top edge of the tank with the travelling bridge 13 positioned centrally of the frame. Next, as shown in FIG. 6, the bridge 13 is driven over the unit 14 where the ramp hitches 43 engage the lifting pins 42 to raise the front end of the unit 14 off of the bottom of the tank. Next, the coupling components 36 are tightened together to connect the pipes 31-34 with the pipes 44-47 respectively. This raises the rear end of the unit 14 off of the bottom of the tank to the operating position shown in FIGS. 1-3. In this operating position, the inlet ends 48a of the suction heads are positioned above the bottom of the tank at a distance depending on the consistency and density of the sludge S which can vary from 1 to 5 inches, for example.

As illustrated in FIG. 8, when the unit 14 is at the end of the tank in the positions illustrated in FIGS. 4-6, the front pair of heads 48 traverse the width of the tank 11 at about the longitudinal center thereof while the rear pair of heads 48 lie adjacent one end wall of the tank.

In operation, the valves 35 in the pipe lines 31-34 are operated in sequence to evacuate the heads 48 for cleaning one quadrant of the tank bottom at a time. Thus, as shown by the numbered arrow head dotted line, one of the rear heads 48 is activated as the bridge moves it along the dotted line 1 to the forward position at the mid-point of the tank thereby, of course, advancing the aligned forward head 48 to the dotted line position at the other end of the tank. This sweeps clean a rear quadrant of the tank bottom. Then the bridge travel is reversed to move the head shown in dotted lines at the other end of the tank back along the line 2 to the previously occupied central position thereby sweeping clean a second quadrant of the tank forwardly of the first quadrant. Next, the other rear head 48 is activated with the bridge moving it along the dotted line 3 to the central position thus cleaning a third quadrant of the tank and advancing the forward head 48 to the other end of the tank. Next the bridge travel is reversed, and the head at the forward end of the tank activated and moved along the dotted line 4 back to its original position, thereby cleaning the last quadrant of the tank. The provision of front and rear pairs of heads and the cleaning of only a single bottom quadrant of the tank minimizes the sucking of clear liquid through the heads as might occur in long units traversing the entire width of the tank. Further, the sequential activation of short suction heads minimizes power requirement. The control panel 37 has relay devices (not shown) for opening and closing the valves 35 and for driving and reversing the motor 17 so that the entire bottom of the tank is cleaned in quadrants on the cycle requiring only two advancing and retracting strokes. At the completion of these strokes, the bridge has returned to cage 14 to its initial position at one end of the tank. Then the couplings 36 are uncoupled to separate the bridge cage parts from the cage carry parts and dropping the rear end of the cage on the tank bottom. Next the bridge is moved back to its central position in the frame thereby moving the hitches 43 out from under the lifting pins 42. The crane then merely lifts the frame unit 12 off of the tank and next removes the cage unit 14 from the tank for transporting to another tank and then mounting the frame unit 12 on top of this other tank.

Alternately, the entire assembly can be moved from the tank in one piece if head room permits. The feature of separating the rigid suction head frame from the bridge provides for compact storage and ease in moving.

From the above descriptions it will be clear that this invention provides an easily transportable travelling bridge suction cleaner for tanks and the like which is installed and removed from the tanks in two sections and which functions to selectively remove sludge from portions of the tank bottom for conserving energy.

While various changes and modifications might be proposed by those skilled in the art, it will be understood that we wish to include within the claims of the patent warranted hereon all such changes and modifications as reasonably come within our contribution to the art.

We claim as our invention:

1. A portable suction cleaner for tanks which comprises a first frame sized for resting on top of a tank to be cleaned, tracks on said first frame, a bridge riding on said tracks, a drive screw having one end secured to said bridge, a nut actuator secured to said first frame driving said screw to reciprocate the bridge along the length of said tracks, a suction pump, an outlet for said pump for discharging out of the tank to be cleaned, an inlet to said pump having a plurality of branches, a second rigid frame fitting freely in an upright position on the bottom of the tank to be cleaned to stand erect in the tank when not connected to said first frame, a plurality of suction heads fixedly mounted on the bottom of said second frame, means releasably connecting the second frame to the bridge on the first frame to suspend the second frame in its upright position in the tank for travel with the bridge, a pipe connecting each suction head with a separate branch of said inlet to the pump, and a separate valve for each pipe controlling flow from the suction heads to the pump.

2. The cleaner of claim 1 including a tube receiving the drive screw in telescoping actuation and having one end secured to the first frame and the other end secured to the nut actuator.

3. The cleaner of claim 1 including a platform on the first frame supporting the nut actuator in alignment with the drive screw.

4. A portable suction cleaner for open top tanks which comprises a first portable frame sized to rest releasably on the tops of the tanks to be cleaned, tracks on said first frame, a travelling bridge having wheels riding on said tracks of said first frame, means on said first frame driving said bridge along the length of the frame, a second rigid upright frame fitting freely into the tanks and standing erect in an upright position on the bottoms of the tanks when not connected to said first frame, a plurality of suction heads fixed to the bottom of said second frame, means releasably suspending the second frame from the bridge on the first frame to position the suction heads of the second frame at the bottom of the tank into which the second frame is placed, suction pump means supported on said first frame, pipes connecting the suction pump means with the suction heads, and a discharge pipe on said suction pump means for extending over the tops of the tanks to dispose of the sludge sucked through said heads from the bottom of the tank.

5. The cleaner of claim 4 wherein the first frame has angle side and end beams with horizontal legs positioned for resting on top of the tank and depending legs snugly fitting inside the tank.

6. The cleaner of claim 4 including a yoke on the first frame for receiving a lifting hook to facilitate transfer of the cleaner.

7. The cleaner of claim 4 wherein the suction pump means includes an air driven pump with an inlet connected through a flexible pipe with the pipes of the suction heads.

8. A portable sludge cleaner for servicing a plurality of open top tanks which comprises a first portable frame releasably fitting the tops of the tanks to be cleaned, a travelling bridge mounted on said first frame, power means on said first frame to drive the bridge along the length of a tank to be cleaned, a second portable rigid frame fitting freely into the tank to be cleaned and standing erect in an upright position on the bottom of the tank, when not connected to said first frame, suction heads fixedly secured on the bottom of said second frame, means detachably connecting the second frame with the travelling bridge on the first frame to suspend the suction heads on the second frame adjacent the bottom of the tank, suction pump means selectively supported on the bridge or on the first frame, pipes connecting the suction pump means with the suction heads, valves controlling flow through said pipes, and a discharge pipe extending from the suction pump means beyond the tank for disposing of sludge sucked through the suction heads from the bottom of the tank.

9. The cleaner of claim 8 wherein the bridge has ramp hitches depending from the bridge and the second frame has laterally projecting lugs engaging said ramp hitches for lifting the second frame off the bottom of the tank to suspend it from the bridge.

10. The cleaner of claim 8 wherein the pipes each have separate sections on the bridge and on the second frame and detachable couplings connect said sections and suspend the second frame.

11. The cleaner of claim 8 including front and rear pairs of side-by-side suction heads on the bottom of the second frame, and each pair having a combined width spanning the width of the tank being cleaned.

12. The cleaner of claim 8 wherein the second frame has four upstanding corner beams, horizontal beams connecting the corner beams, and diagonal truss beams connecting the corner beams cooperating to provide a rigid upright support for the suction heads.

* * * * *